US011444412B1

(12) United States Patent
Deppen et al.

(10) Patent No.: US 11,444,412 B1
(45) Date of Patent: Sep. 13, 2022

(54) RANDOMIZED SPRING ARRAY FOR ELECTRICAL SEPARATION INTERFACE

(71) Applicant: LOCKHEED MARTIN CORPORATION, Bethesda, MD (US)

(72) Inventors: Ronald Elwood Deppen, Peyton, CO (US); Lynn Carol Cain, Lakewood, CO (US); Tiffany Phayvanh Chanthavong, Aurora, CO (US); Jeffrey John Bank, Littleton, CO (US); Spencer Keith Connor, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 233 days.

(21) Appl. No.: 16/775,137

(22) Filed: Jan. 28, 2020

(51) Int. Cl.
*H01R 13/635* (2006.01)
*H01R 13/533* (2006.01)
*B64G 1/64* (2006.01)

(52) U.S. Cl.
CPC ......... *H01R 13/635* (2013.01); *H01R 13/533* (2013.01); *B64G 1/641* (2013.01); *B64G 1/645* (2013.01)

(58) Field of Classification Search
CPC ............... B64G 1/44; B64G 1/22; B64G 1/12
See application file for complete search history.

(56) References Cited

U.S. PATENT DOCUMENTS 5,429,851 A * 7/1995 Sallee ................... B64G 1/12
 428/221
2016/0311558 A1 * 10/2016 Turse ................... B64G 1/222

* cited by examiner

*Primary Examiner* — Timothy D Collins
*Assistant Examiner* — Rodney M Henry
(74) *Attorney, Agent, or Firm* — BakerHostetler (57) ABSTRACT

An electrical interface can include one or more connector devices that facilitate communication between components while they are connected. The connector devices can provide a secure communication and/or power link that resists infiltration by foreign object debris ("FOD") as well as redundant electrical pathways. The connector devices can further provide mechanisms that are lightweight, are operable in a broad range of temperatures (e.g., low temperatures), accommodate displacement without loss of electrical continuity, and are of low resistance and induction. The connector devices can further provide a kickoff force upon separation of the components.

11 Claims, 5 Drawing Sheets

RANDOMIZED SPRING ARRAY FOR ELECTRICAL SEPARATION INTERFACE

STATEMENT REGARDING FEDERALLY SPONSORED RESEARCH OR DEVELOPMENT

The invention was made with Government support, and the Government has certain rights in the invention by the terms of Contract No. 1481537 awarded by the National Aeronautics and Space Administration.

TECHNICAL FIELD

The present description relates in general to securement and release mechanisms for separable components of a system, and more particularly to, for example, without limitation, a randomized spring array for an electrical separation interface.

BACKGROUND OF THE DISCLOSURE

Space flight and other transport mechanisms can be used to transport payloads. Such a payload can include satellites or other instruments for deployment, e.g., in orbit or toward a surface of a planet. For example, a vehicle can be launched with a satellite or another vehicle as a payload. Upon achievement of a particular trajectory (e.g., orbit), the vehicle can deploy the satellite so that it can continue independently of the vehicle.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

A spacecraft, other vehicle, or system with deployable components can be provided to deliver and deploy a payload in space or toward a surface of a planet. Such payloads can include satellites, such as CubeSat devices, nanosat devices, drones, unmanned aerial vehicles, other spacecraft, other aircraft, other aerial vehicles, aquatic vehicles, land vehicles, other vehicles, or any other components. A delivery vehicle and a payload can be provided with a connection that provides secure mechanical engagement as well as a communication channel and/or power transfer conduit during coupling of the components. It can be desirable to separate the components during operation to deploy the payload. Thus, the mechanical engagement and the communication and/or power link can be removed by separation of the components.

It can be desirable to provide an interface that facilitates communication between components while they are connected. It can further be desirable for such an interface to provide a secure communication and/or power link that resists infiltration by foreign object debris ("FOD") as well as redundant electrical pathways. It can further be desirable for such an interface to be lightweight, operable in a broad range of temperatures (e.g., low temperatures), accommodate displacement without loss of electrical continuity, and be of low resistance and induction. It can further be desirable for such an interface to provide a kickoff force upon separation.

Figure 1:
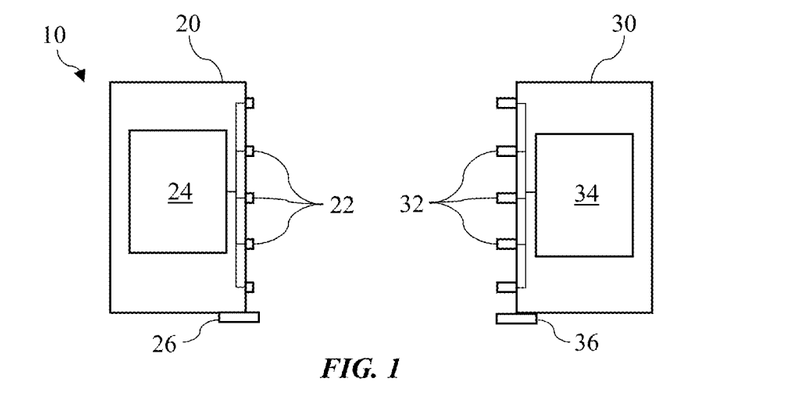
FIG. 1 illustrates a schematic view of an example of a system with separable components.
Figure 2:
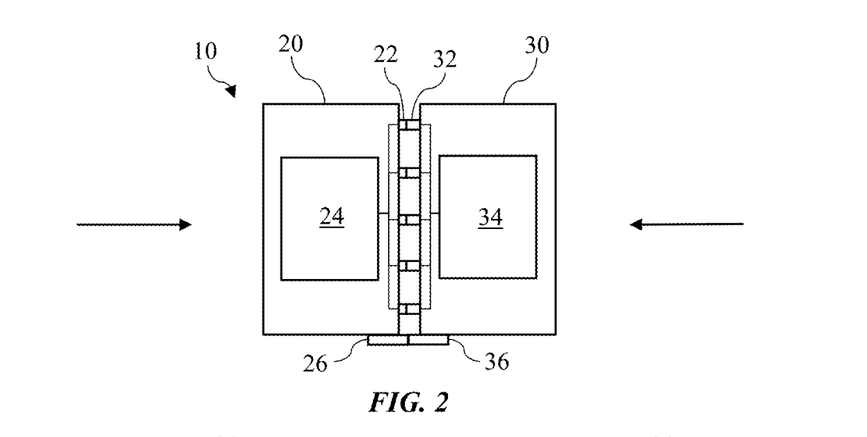
FIG. 2 illustrates a schematic view of the system of FIG. 1, with the separable components being connected.
Figure 3:
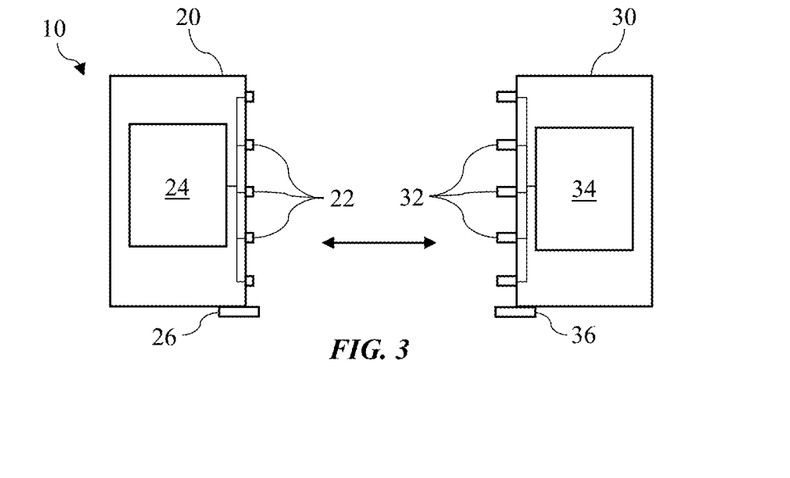
FIG. 3 illustrates a schematic view of the system of FIGS. 1 and 2, with the separable components being separated.

Referring to FIGS. 1-3, a system can be provided with mechanisms for connecting separable components to provide electrical contacts for communication there between. For example, as shown in FIG. 1, a system 10 can include a first device 20 and a second device 30 that can be connected to and separated from each other. Such connection and separation can be controllable, reversible, and repeatable. Such a connection can include a mechanical engagement that maintains the devices in a fixed position and/or orientation relative to each other. Such a connection can include a communication and/or power link that allows one or more electronic components of the two devices to be in operable communication with each other.

The devices of the system and the system itself can be or include one or more of a variety of devices. For example, the system and/or its devices can include a spacecraft or other vehicle, such as a satellite, orbiter, lander, rover, and/or other module. By further example, the system and/or its devices can include a drone or other deployable vehicle. Additionally or alternatively, one of the devices can include a payload that is carried by the other device. One device can carry the payload during transit and subsequently deploy the payload as desired. In some aspects, one device can serve as a host to the other device.

Each of the devices can include electronic components that manage one or more operations of the corresponding device. For example, the first device 20 can include a first electronic component 24, and of the second device 30 can include a second electronic component 34. Such electronic components can include, without limitation, processors, controllers, circuitry, sensors, communication devices, and the like. The electronic components can control and/or monitor one or more operations of the corresponding device.

Additionally or alternatively, the electronic components of one device can control and/or monitor one or more operations of the other device while connected thereto.

As further shown in FIG. 1, each of the devices can include elements that provide an electrical interface there between. For example, the first device 20 can include one or more electrical interface elements 22 at or on an exterior portion of the first device 20. The electrical interface elements 22 can include any component that provides a surface for contact and electrical conduction. For example, the electrical interface elements 22 can include conductive plates, pins, sockets, or other conductive surfaces that are accessible for connection.

The second device 30 can include one or more connector devices 32 at or on an exterior portion of the second device 30. The connector devices 32 can include components that provide and maintain electrical contact with the electrical interface elements 22, as described further herein.

As shown in FIG. 2, the first device 20 in the second device 30 can be connected to each other in a manner that provides mechanical engagement as well as a communication and/or power link. For example, the first device 20 can include a first engagement element 26, and the second device 30 can include a second engagement element 36. The first engagement element 26 and the second engagement element 36 can engage each other in a manner that secures the relative positions and/or orientations of the first device 20 and the second device 30 with respect to each other. One or both of the engagement elements can include locks, latches, snaps, screws, clasps, threads, magnets, pins, Frangibolts, separation nuts, cable cutters, and/or combinations thereof, and the like. The mechanical engagement can be controllable, reversible, and repeatable.

When the first device 20 in the second device 30 are connected (e.g., with the first engagement element 26 and the second engagement element 36 engaging each other), the electrical interface elements 22 and the connector devices 32 can be connected in a manner that provides a communication and/or power link there between. Such a communication and/or power link can operatively connect the first electronic component 24 to the second electronic component 34. The mechanical engagement and the communication and/or power link can both be achieved and maintained simultaneously or sequentially.

As shown in FIG. 3, the first device 20 and the second device 30 can be separated from each other. For example, the first engagement element 26 and the second engagement element 36 can be released or otherwise disengaged to allow the first device 20 and the second device 30 to move independently of each other. Upon separation, the communication and/or power link formed by the electrical interface elements 22 and the connector devices 32 can be broken. The mechanical engagement and the communication and/or power link can be terminated simultaneously or sequentially.

Figure 4:
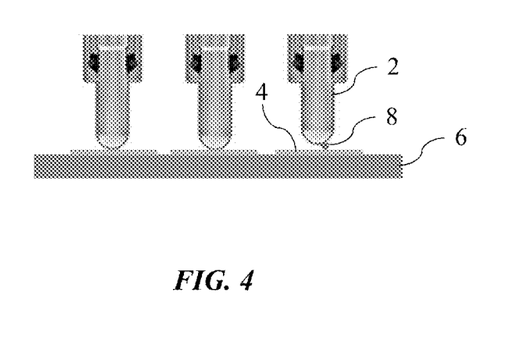
FIG. 4 illustrates a side view of a connection system with pogo pins.

In some designs, a communication and/or power link is provided by a mechanism that is susceptible to disruption by the introduction of FOD. For example, as shown in FIG. 4, the use of pogo pins to form a communication and/or power link can be ineffective in certain conditions. In the example of FIG. 4, pogo pins 2 are generally rigid structures that are biased with a separate spring to extend towards a contact element 4 on a surface of a circuit board 6. When the pogo pins 2 are brought to the corresponding contact elements 4, the pogo pins 2 can retract as needed by compressing the spring after contacting the contact elements 4. However, pogo pins generally contact an opposing contact element at a single point. In conditions involving high vibration and in the presence of FOD 8, the pogo pins 2 can retract enough to allow the FOD 8 to enter between the pogo pin 2 and the contact element 4. Thereafter, the spring bias urging the pogo pins toward the contact elements can trap the FOD there between. Due to the small region of potential contact, a single particle of FOD can disrupt a communication and/or power link between the pogo pin 2 and the contact element 4.

An electrical interface can include one or more connector devices that facilitate communication between components while they are connected. The connector devices can provide a secure communication and/or power link that resists infiltration by FOD as well as redundant electrical pathways. The connector devices can further provide mechanisms that are lightweight, are operable in a broad range of temperatures (e.g., low temperatures), accommodate displacement without loss of electrical continuity, and are of low resistance and induction. The connector devices can further provide a kickoff force upon separation of the components.

Figure 5:
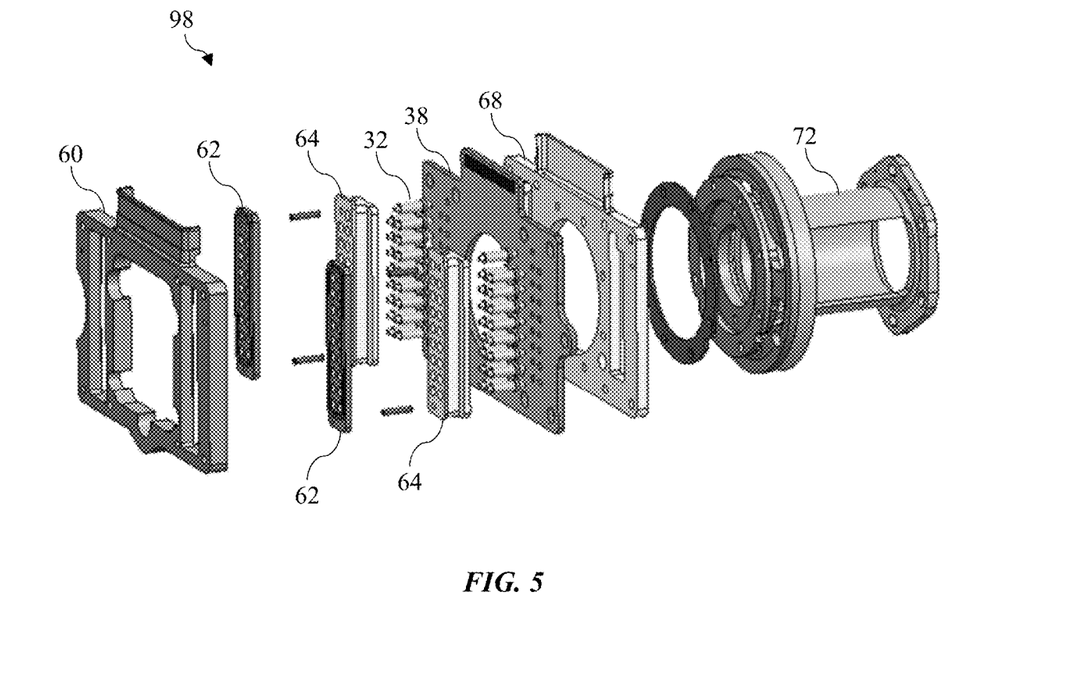
FIG. 5 illustrates a perspective exploded view of an example of a connection system.

Referring now to FIG. 5, an assembly 98 can provide at least one side of an electrical interface for separable connection with another device. As shown in FIG. 5, one or more connector devices 32 can be provided in an array and facing in a direction to contact and/or engage with other components of an electrical interface to form a communication and/or power link with another device. Each of the connector devices 32 can face in a common direction and/or have terminal ends that are aligned within a common plane. It will be understood that other configurations are contemplated, such as connector devices that are facing in different directions and/or staggered in different planes. In some embodiments, the connector devices 32 can be arranged in a manner that allows them to simultaneously contact corresponding electrical interface elements of an opposing device when connected thereto.

The connector devices 32 can be mounted and/or operably connected to a circuit board 38. The circuit board 38 can provide appropriate structural support and/or electrical connections to the connector devices 32 as well as any other electronic components. The circuit board 38 and the connector devices 32 mounted thereto can be supported to other structures that provide support and/or a connection to other components. For example, the circuit board 38 can be mounted to a rear clamp plates 68 and/or an adjustment shim 72 for secure and/or adjustable mounting to other components.

The connector devices 32 can extend from the circuit board 38 and through one or more support blocks 64 that provide channels for directing the connector devices 32 and maintaining them in a particular orientation relative to the circuit board 38. The assembly 98 can further include a front clamp plate 60 that engages the rear clamp plate 68 to provide a housing that at least partially encloses the connector devices 32 and the circuit board 38, as well as other components. One or more seals 62 can be provided between various components, such as the front clamp plate 60 and the support blocks 64 to isolate at least a portion of the connector devices 32 from external environment. Other portions of the connector devices 32 can extend through and/or protrude beyond portions of the assembly 98, such as the front clamp plates 60, to facilitate engagement and/or contact with electrical interface elements of another device.

Figure 6:
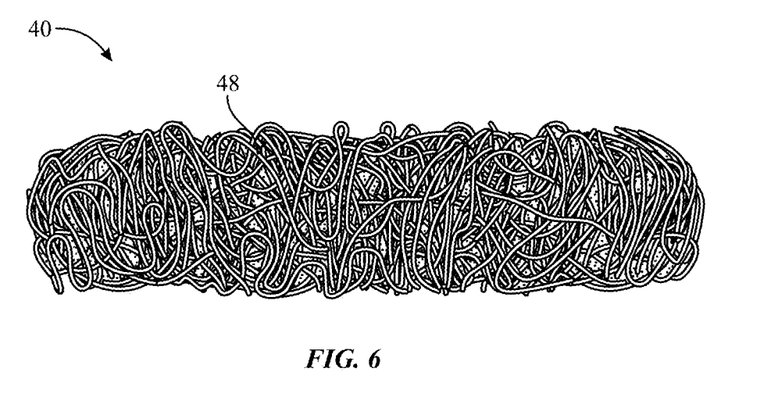
FIG. 6 illustrates a side view of an example of a compressible wire mat.
Figure 7:
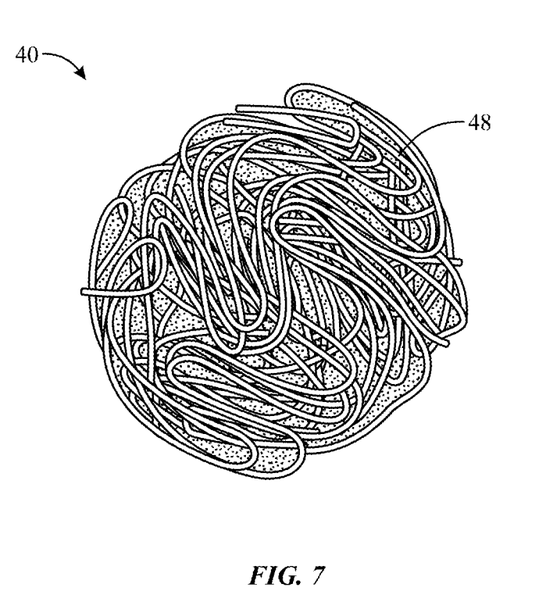
FIG. 7 illustrates a front view of the compressible wire mat of FIG. 6.

Referring now to FIGS. 6 and 7, one or more of the connector devices can include a compressible wire mat 40 that defines a terminal end thereof and provides point of contact with an electrical interface element of another device.

As used herein, a compressible wire mat comprises one or more strands 48 of wire in an arrangement that forms multiple windings and turns in a variety of directions and locations within the mass. The strand 48 can be singular and continuous across the entire mass, or multiple strands can be wound and compressed together. The segments of the strand 48 can become tangled together or otherwise cross each other. The strand 48 can include one or more conductive materials. For example, the strand 48 can include a core and a coating or plate. In some embodiments, the strand 48 can be gold-plated beryllium-copper wire. It will be understood that other materials can be used for the core and/or plating. It will be understood that, in some embodiments, only a single conductive material can optionally be used (e.g., monolithically formed and without plate or coating). An example of a compressible wire mat includes Fuzz Buttons® from Custom Interconnects of Centennial, CO.

To form the compressible wire mat 40, the strand 48 can be compressed into a dense, sponge-like cylindrical shape. In such a shape, the strand 48 can have multiple windings and turns that can be arranged in a random or highly disorganized manner. The windings can extend in any directions and provide segments of the strand 48 that are non-parallel. Multiple segments can contact each other at various locations where they cross each other. The strand 48 can form turns that alter the directions in which the segments extend. In contrast to a helical spring, the strand 48 can wind in different directions and the turns can be about different axes at different locations within the compressible wire mat 40. The strand 48 can form numerous openings within the compressible wire mat 40, so that the segments of the strand 48 are capable of moving relative to each other, thereby facilitating further compression in one of more directions. The spaces between segments can be occupied by air, vacuum, or a compressible filler (e.g., dielectric material).

The compressible wire mat 40 can be of any shape and size. In the examples illustrated, the compressible wire mat 40 can be of a generally cylindrical shape having a length that is greater than its diameter. It will be understood that other shapes and/or relative sizes are contemplated.

As shown in FIG. 7, the compressible wire mat 40 can form multiple independent points for contact at an end thereof. For example, the multiple windings and turns of the strand 48 can provide different segments of the strand 48 at a terminal end of the compressible wire mat 40. Each of these segments can provide an independent point of potential contact with an electrical interface element of another device. Because the compressible wire mat 40 is formed of a strand 48 with independent windings and turns, the different segments of the strand 48 remain able to move relative to each other even after formed into the compressed shape as well as when contacting electrical interface element. As such, the separate segments of the strand 48 can, under compression of the compressible wire mat 40, move at least somewhat independently to make contact with the electrical interface element. Because the segments of the strand 48 are in electrical conduction with each other (e.g., through the length of the strand 48 and/or points at which the strand 48 crosses itself), each of the points can provide electrical conduction to form a communication and/or power link.

Figure 8:
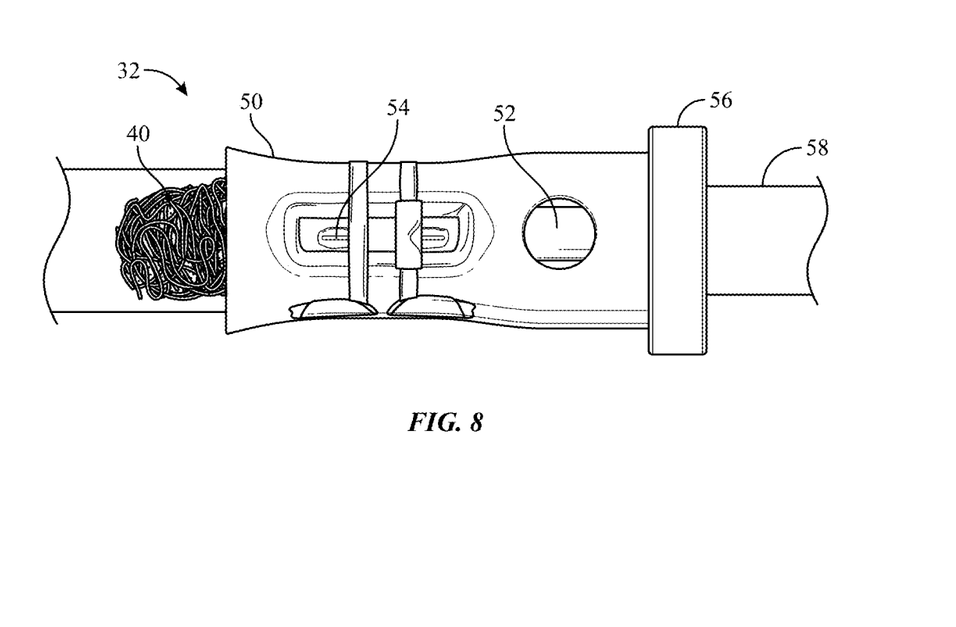
FIG. 8 illustrates a side view of an example of a connector device.
Figure 9:
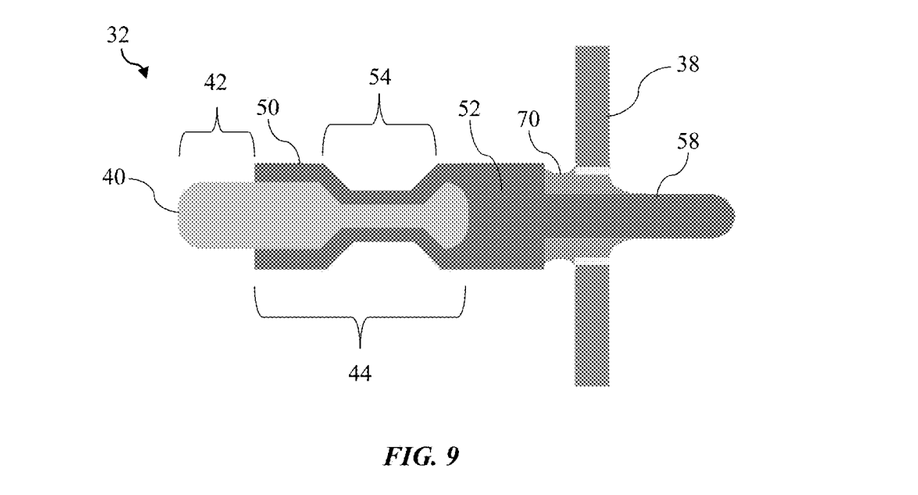
FIG. 9 illustrates a sectional view of the connector device of FIG. 8.

Referring now to FIGS. 8 and 9, the connector device can incorporate the compressible wire mat to form a contact for an electrical interface that has elastic properties. As shown in FIG. 8, a connector device 32 can include a housing 50 defining a chamber 52 therein. The housing 50 can provide an opening at an end thereof for access to the chamber 52. The compressible wire mat 40 can be at least partially inserted into the chamber 52 of the housing 50. The housing 50 can include or be attached to a protrusion 58 that extends away from the housing 50. The housing 50 can include or be attached to a shoulder 56 that provides a cross-sectional dimension that is greater than a cross-sectional dimension of a portion of the housing 50 that contains the compressible wire mat 40.

As shown in FIG. 9, the compressible wire mat 40 can be partially contained within the housing 50. For example, the compressible wire mat 40 can include a middle portion 44 that is within the chamber 52 of the housing 50. The compressible wire mat 40 can further include an end portion 42 that extends out of the chamber 52 and beyond the housing 50. The housing 50 can include an engagement portion 54 with a reduced cross-sectional dimension relative to adjacent portions of the housing 50. For example, the engagement portion 54 of the housing 50 can be crimped or otherwise modified to engage a portion of the compressible wire mat 40, such as a portion of the middle portion 44 of the compressible wire mat 40. In such an arrangement, the compressible wire mat 40 can be securely engaged by the housing 50 and provided with electrical conduction therewith.

When the engagement portion 54 of the housing 50 is crimped to engage the compressible wire mat 40, the compressible wire mat 40 can be radially compressed in a manner that also tends to cause it to longitudinally elongate. As such, ends of the compressible wire mat 40 on opposite sides of the engagement portion 54 can tend to extend away from the engagement portion 54. The chamber 52 can be provided with space to allow a degree of elongation so that the final extent of the end portion 42 of the compressible wire mat 40 beyond the end of the housing 50 is controlled.

The compressible wire mat 40 can have a non-uniform density of packed strand segments along its length. For example, one end can have more densely packed strand segments than another end. In some embodiments, the more densely packed end can be positioned as the end portion 42 of the compressed wire mat 40. In other embodiments, the more densely packed and can be positioned within the chamber 52.

Additionally or alternatively, other mechanisms for securing the compressible wire mat 40 within the housing 50 can be provided. For example, the compressible wire mat 40 and the housing 50 can be bonded, fused, and/or latched together at one or more locations.

The connector device 32 can be connected to the circuit board 38. For example, the protrusion 58 can extend away from the housing 50 and through a portion of the circuit board 38. Solder or other bonding material 70 can be provided at an interface between the connector device 32 and the circuit board 38. For example, the bonding material 70 can be provided to the circuit board 38 and the housing 50 and/or the protrusion 58.

While the end portion 42 of the compressible wire mat 40 extends beyond the housing 50, an entire length of the compressible wire mat 40 between a terminal end thereof and the engagement portion 54 of the housing 50 can provide a capability to be compressed along a longitudinal axis of the compressible wire mat 40. Because these segments of the strand that form the compressible wire mat 40 maintain an ability to move relative to each other, the segments can move when the compressible wire mat 40 is pressed against an electrical interface element of another device. In this configuration, the compressible wire mat 40 can provide a constant spring force against the electrical interface element of the other device.

The connector device 32 can provide a communication and/or power link with an electrical interface element of another device. For example, a communication and/or power link can be formed by conductive pathways extending between the electrical interface element of the other device, the multiple points of contact between the compressible wire mat 40 and the electrical interface element, the compressible wire mat 40 and the housing 50, the housing 50 and the circuit board 38 (e.g., via the bonding material 70 and/or the protrusion 58).

The compressible wire mat 40 can provide multiple points of contact with the electrical interface element, the multiple points of contact being spaced apart from each other on the surface of the electrical interface element. These multiple points of contact can provide redundancy to avoid a loss of the communication and/or power link in the event that FOD becomes interposed between a portion of the compressible wire mat 40 and the electrical interface element. Not only would the spring characteristics of the compressible wire mat 40 resist such interposition, but the communication and/or power link could be maintained at another region of contact.

In the compressed configuration, the compressible wire mat 40 can provide a spring force that stores potential energy. This energy can be released upon separation of the devices from each other. The effect of such releases that the devices can be urged away from each other by a kickoff force provided by the compressible wire mat 40. Such a force can overcome the inertia of the devices in the connected (e.g., mechanically engaged) configuration and achieve separation. Additionally, such a force need not be activated by or timed based on the activity of any mechanical engagement mechanisms.

Figure 10:
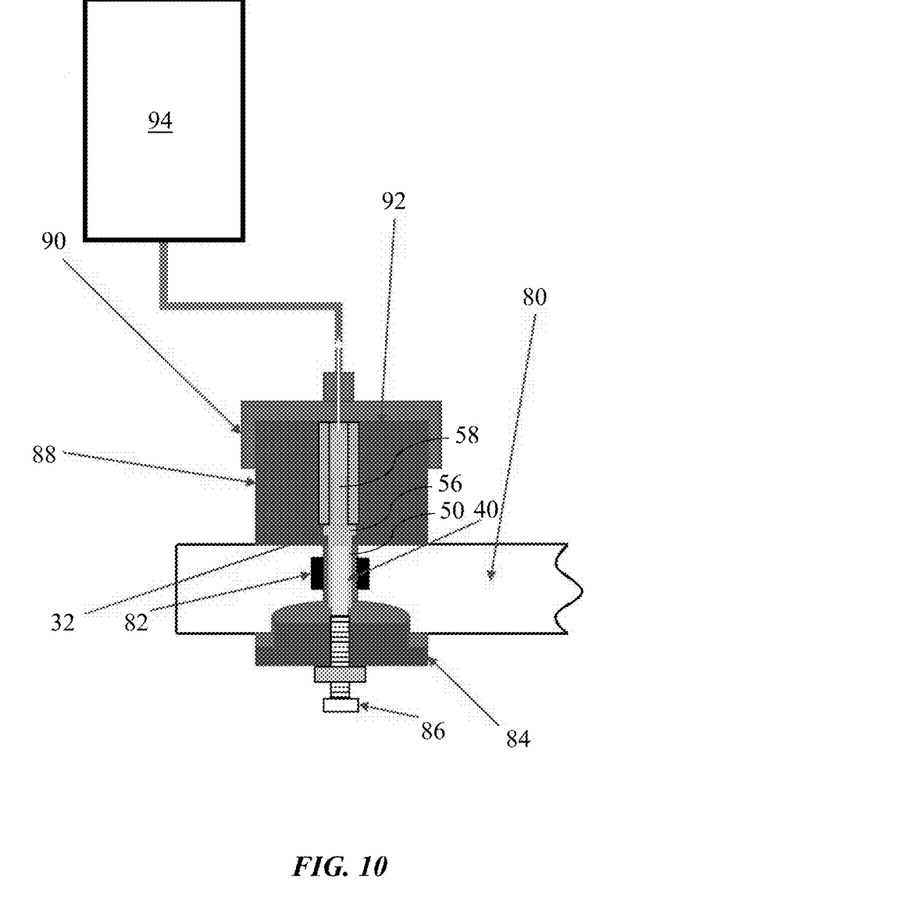
FIG. 10 illustrates a sectional view of an example of an assembly system for assembling a connector device.

Referring now to FIG. 10, the method of assembling the connector device 32 can be performed in a manner that couples the parts thereof with a desired alignment. For example, the connector device 32 can be provided with the housing 50 in a crimping device 80. The crimping device 80 can include a crimped indenter 82 that crimps the engagement portion of the housing 50 onto the compressible wire mat 40. Before crimping the housing 50, the compressible wire mat 40 can be positioned relative to the housing 50 by adjusting a depth adjustment element 86 of a depth adjustment tool 84. For example, the depth adjustment element 86 can be a screw, nut, and/or other adjustable element that is controllably moved. As the depth adjustment element 86 moves, the compressible wire mat 40 can rest against the depth adjustment element 86 and move along with it. For example, as shown in FIG. 10, the compressible wire mat 40 can be oriented in a manner that allows it to move gravitationally downward against the depth adjustment element 86. It will be understood that other mechanisms for urging the compressible wire mat 40 to follow the depth adjustment element 86 are contemplated, such as magnetic and/or mechanical coupling.

The housing 50 of the connector device 32 can be held in a position while the compressible wire mat 40 is adjusted. For example, a vacuum device 94 can be connected via a vacuum adapter 92 and/or a crimp locator head 88 that engages the housing 50 of the connector device 32. In such a configuration, the vacuum device 94 can be operated to pull and hold the housing 50 away from the depth adjustment element 86. For example, the housing 50 can be held in position against the force of gravity. It will be understood that other mechanisms for urging the housing 50 away from the depth adjustment element 86 are contemplated, such as magnetic and/or mechanical coupling.

When the housing 50 and the compressible wire mat 40 are in a desired alignment, the crimping device 80 can be operated to deform the housing 50 so that it engages the compressible wire mat 40. Thereafter, at least a portion of the compressible wire mat 40 can be held in a fixed position relative to the housing 50 by the engagement thereof. Additionally, at least an end portion of the compressible wire mat 40 can be compressed as discussed herein while the middle portion of the compressible wire mat 40 is engaged by the housing 50.

Accordingly, embodiments of the present disclosure can include an electrical interface that includes one or more connector devices that facilitate communication between components while they are separably connected. The connector devices can provide a secure communication and/or power link that resists infiltration by foreign object debris ("FOD") as well as redundant electrical pathways. The connector devices can further provide mechanisms that are lightweight, are operable in a broad range of temperatures (e.g., low temperatures), accommodate displacement without loss of electrical continuity, and are of low resistance and induction. The connector devices can further provide a kickoff force upon separation of the components.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A spacecraft comprising:
   a first device comprising:
     a first electronic component;
     a connector device comprising:
       a housing having a chamber;
       a compressible wire mat being partially within the chamber and engaged by the housing; and
   a second device being connected to and separable from the first device, the second device comprising:
     a second electronic component; and
     an electrical interface element electrically connected to the first electronic component; and
   wherein the compressible wire mat is compressed against the electrical interface element of the second device and the first electronic component is in communication with the second electronic components via the electrical interface element and the connector device.

2. The spacecraft of claim 1, wherein the compressible wire mat comprises a strand that contacts the electrical interface element of the second device at multiple portions of the strand.

3. The spacecraft of claim 1, wherein:
   the first device further comprises a first engagement element; and
   the second device further comprises a second engagement element configured to engage the first engagement element to couple the first device to the second device.

4. The spacecraft of claim 1, wherein the compressible wire mat comprises a strand of metal winding between ends of the compressible wire mat.

5. The spacecraft of claim 1, wherein the compressible wire mat comprises:
   a middle portion engaged by the housing; and
   an end portion extending out of the chamber, the end portion being compressible to provide a spring bias against a surface of the electrical interface element.

6. The spacecraft of claim 5, wherein the housing comprising a engagement portion with a reduced cross-sectional dimension that is crimped onto the middle portion of the compressible wire mat.

7. The spacecraft of claim 6, wherein the end portion of the compressible wire mat is a first end portion, the compressible wire mat further defining a second end portion that is within the chamber of the housing and extending beyond the engagement portion of the housing.

8. The spacecraft of claim 6, further comprising:
   a shoulder having a cross-sectional dimension that is larger than a cross-sectional dimension of the housing; and
   a protrusion extending from the shoulder.

9. The spacecraft of claim 1, wherein the connector device is one of multiple connector devices extending along parallel axes from a circuit board, wherein the compressible wire mat of each of the connector devices is compressed along the corresponding axis.

10. The spacecraft of claim 1, wherein the first device is a vehicle and the second device is a payload.

11. The spacecraft of claim 1, wherein the second device is a vehicle and the first device is a payload.

* * * * *

UNITED STATES PATENT AND TRADEMARK OFFICE
CERTIFICATE OF CORRECTION

| | |
|---|---|
| PATENT NO. | : 11,444,412 B1 |
| APPLICATION NO. | : 16/775137 |
| DATED | : September 13, 2022 |
| INVENTOR(S) | : Ronald Elwood Deppen et al. |

It is certified that error appears in the above-identified patent and that said Letters Patent is hereby corrected as shown below:

In the Specification

Column 1, Lines 7-10:
"The invention was made with Government support, and the Government has certain rights in the invention by the terms of Contract No. 1481537 awarded by the National Aeronautics and Space Administration."
Should read:
--The invention described herein was made in the performance of work under NASA Contract NNN12AA01C and is subject to the provisions of section 20135 of the National Aeronautics and Space Act (51 U.S.C. § 20135).--.

Signed and Sealed this
Twenty-first Day of May, 2024

Katherine Kelly Vidal
*Director of the United States Patent and Trademark Office*